United States Patent [19]

Roos

[11] 3,969,765

[45] July 13, 1976

[54] DEVICE FOR THE THERMOMAGNETIC RECORDING OF INFORMATION

[75] Inventor: Jan Roos, Eindhoven, Netherlands

[73] Assignee: U.S. Philips Corporation, New York, N.Y.

[22] Filed: May 20, 1974

[21] Appl. No.: 471,547

[52] U.S. Cl.................................... 360/59; 360/84
[51] Int. Cl.² ...................... G11B 5/02; H04N 1/28
[58] Field of Search................................ 360/59, 84

[56] References Cited
UNITED STATES PATENTS

| | | | |
|---|---|---|---|
| 3,404,241 | 10/1968 | Streets | 360/84 |
| 3,611,420 | 10/1971 | Benoit | 360/59 |
| 3,626,114 | 12/1971 | Lewicki | 360/59 |
| 3,715,740 | 2/1973 | Schmit | 360/59 |
| 3,840,895 | 10/1974 | Kubo | 360/84 |

Primary Examiner—Bernard Konick
Assistant Examiner—Jay P. Lucas
Attorney, Agent, or Firm—Frank R. Trifari; Simon L. Cohen

[57] ABSTRACT

A device for the thermomagnetic recording of information on a highly coercive magnetizable recording medium. For this purpose is used, for example, a video recorder of the "helical scan" or "transversal scan" type whose drum has a co-rotating mirror and system of lenses with which an energy beam is directed and focussed on the recording medium at a small distance in front of the recording gap of the magnetic head. As a result of this the coercive force of the recording medium is locally reduced while using a very short heating time so that the medium can be recorded there by the head.

6 Claims, 5 Drawing Figures

DEVICE FOR THE THERMOMAGNETIC RECORDING OF INFORMATION

The invention relates to a device for recording information on a magnetizable recording medium having a temperature-dependent coercive force and being provided on an elongated carrier comprising means for moving the carrier, at least one electromagnetic converter cooperating with the recording medium for producing a magnetic field having a field strength at the area of the recording medium below the coercive force at room temperature thereof, and a heating source to locally heat the recording medium to a temperature above room temperature.

Such a "thermomagnetic" recording device is described in U.S. Pat. No. 3,364,496. As an electromagnetic converter in the device is used a conventional magnetic head which co-operates with a magnetic tape consisting of a carrier which has a magnetic material of a (low) Curie temperature between 60° and 130°C (for example, chromium dioxide) dispersed in a layer of lacquer. One poleshoe of the magnetic head is kept at a temperature above the Curie temperature of the magnetic tape in a manner not further described. By moving the magnetic tape across the head, the magnetic material is heated above the Curie temperature at the area of the said poleshoe, so that it comes in the paramagnetic condition. While it is at this temperature, the magnetic material is subjected to the magnetic field of the head and during the subsequent cooling it returns to the ferromagnetic condition and is magnetized by the field of the head. The strength of the magnetic field required for this purpose may thus be lower than the coercive force at room temperature of the magnetic material. It is furthermore described in the said patent specification that it is also possible to use light or infrared radiation to heat the magnetic layer.

A drawback of this known device is that the heating rate of the magnetic layer is determined by the comparatively slow rate of movement of the tape and the comparatively large dimensions of the heated surface. As a result of this the heating time of the magnetic layer is comparatively long and notably longer than the thermal relaxation time through the magnetic material so that the carrier is also heated and reaches substantially the same temperature as the magnetic layer. This means that, in order to heat the magnetic layer, more thermal energy is used than is actually necessary. Moreover, the carrier may show an annoying shrinkage as a result of the occurring rise in temperature and subsequent cooling, which cannot be compensated for.

Stringent requirements are imposed in particular upon video tapes as regards the dimensional stability. Due to the time-dependent viscous after-effect of the carrier material — which in practice is always pre-stressed — a stay of hours at, for example, 80°C or a stay of milliseconds at, for example, 150°C will have a fatal influence on the playback capability of a video tape. This means on the one hand that the thermomagnetic recording in the described device of tapes with a magnetic material having a Curie point in the proximity of 130°C, for example $CrO_2$, will provide considerable drawbacks in practice. On the other hand, the recording in the device described of tapes with a magnetic material having a Curie point in the proximity of 60°C, if at all available, will present fewer drawbacks, it is true, but an unpractical aspect of such tapes is that, when the ambient temperature slightly increases, the recorded information is erased.

It is the object of the invention to provide a device for the thermomagnetic recording which does not exhibit the above-mentioned drawbacks. For that purpose the device according to the invention is characterized in that a device is present for moving the converter(s) in a direction which encloses an angle with the direction of movement of the carrier, that the heating source is a radiation source which produces a concentrated energy beam, and that a device is present to direct the concentrated energy beam onto the recording medium in a place before the magnetic converter co-operating instantaneously with the recording medium viewed in the direction of movement thereof.

The essence of the device according to the invention is that the heating time of the part of the magnetic layer of the magnetic tape to be recorded is many times shorter than in the known device. This is a result of the fact that the relative speed of the head with respect to the tape is much larger, for example 8 meters per second as against 19 cm/second, that is to say 40 times larger, than in the known device and because the heating energy is focused to a small spot which travels along with the heat at a small distance in front of it. In particular the heating time may be shorter than the thermal relaxation time through the magnetic layer so that the carrier remains cold and can hence not deform and may moreover serve as a "heat sink" for the magnetic layer so that same cools in a short period of time after the heating. Also, in order to bring the magnetic layer at temperature, less thermal energy is necessary than in the known device while just the upper layer which is important for the short wavelength becomes hottest.

The tapes to be recorded in the device according to the invention may be tapes of which the magnetic material has a very high coercive force at room temperature which decreases when the temperature increases in that the contribution of the crystal anisotropy to the coercive force decreases. This material may be, for example, Co-doped $Fe_2O_3$. $CrO_2$, possibly modified so as to increase the coercive force at room temperature, may also be used; in that case heating of the part to be recorded takes place to a few degrees below the Curie temperature (approximately 127°C).

An extra aspect of the device according to the invention is that such tapes which are highly coercive at room temperature are excellently suitable to serve as a master tape in copying processes in which a magnetic auxiliary field is used. In the so-called anhysteretic copying process the magnetic information is transferred at room temperature from a master tape in an alternating field to a slave tape having a lower coercive force. It has so far been deemed not possible to make copies on highly coercive slave tapes, which one would like to use in connection with their higher output, by means of the anhysteretic copying process, because no device was available in which the master tapes which are necessary for that purpose and which have to have an even higher coercive force could be recorded. (see Journal of the Society of Motion Picture and Television Engineers, volume 80, March 1971, pp. 177–178). In order to avoid this problem, the so-called thermoremanent copying process has been developed. In this process each slave tape is heated, at the copying speed of approximately 3 meters per second, throughout the width of the tape to above the Curie temperature and contacted in the heated condition with the master tape in order that the information can be transferred. In the time necessary for this purpose, an annoying non-reversible shrinkage of the carrier of the slave tape occurs, while the time is so long that carrier and magnetic layer of the slave tape reach substantially the same temperature. The heating step and the copying step take place substantially simultaneously. By means of the device according to the invention it is possible to separate the two steps entirely. The master tape is recorded in the device according to the invention, so that thus the heating step takes place once. The copying step can now be carried out in any copying device based on the anhysteretis principle without each time a slave tape having to be heated as in the thermoremanent copying process.

An interesting aspect of the device according to the invention furthermore is that it can be realized in a simple manner by reconstruction of the existing "helical scan" or "transversal scan" video recorder. In the known video recorders, one or more magnetic heads are mounted on the circumference of a rotatable cylindrical supporting member. The magnet tape is laid on the supporting member. During operation the supporting member rotates so that the magnetic heads scan the surface of the tape in a direction which encloses an angle with the direction of movement of the tape.

According to a first embodiment of the device according to the invention the supporting member comprises means (for example a mirror and system of lenses) to direct a beam of energy produced by a source which is arranged independently of the supporting member on the record carrier and to focus it in a place before the converter instantaneously cooperating with the record carrier viewed in the direction of rotation of the supporting member.

A very compact assembly is obtained when, according to a further embodiment of the device according to the invention, the supporting member has means to direct a beam of energy produced by a source of radiation mounted rigidly on the supporting member to the record carrier and to focus it in a place before every converter viewed in the direction of rotation of the supporting member.

In either case it may be efficacious to use a laser as a source of radiation. In particular, when the supporting member has two heads placed diametrically opposite to each other, a laser may be mounted on the supporting member of which the beams emanating on the front and on the rear cooperate with the two magnetic heads.

Within the scope of the invention, the part of the energy beam reflected by the magnetic tape may furthermore be supplied to a detection device. When the temperature measured by said detector differs from the adjusted temperature, a signal may be generated with which the energy output of the source of radiation can be readjusted.

The invention will be described in greater detail, by way of example, with reference to the drawing.

Figure 1:
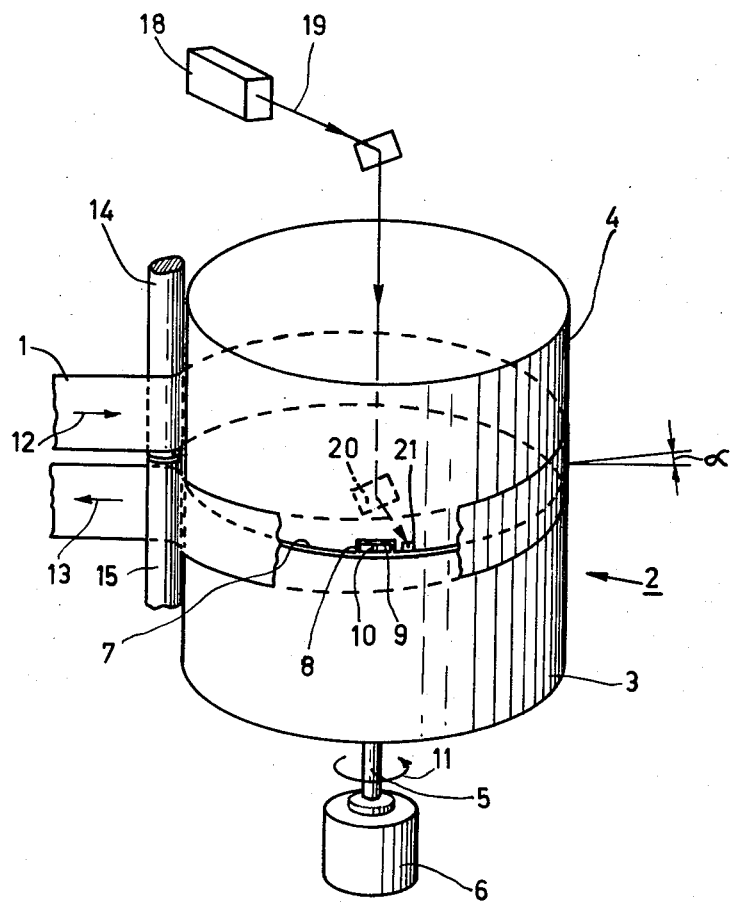
FIG. 1 shows diagrammatically a video recorder according to the invention.

The device shown in FIG. 1 is destined to record information, for example signals which represent a video program, on a magnetic tape 1 having a very high coercive force. For that purpose is present a drum 2 which consists of two halves 3 and 4. The drum 2 may be of the type as is now used in certain video recorders in which the lower half is rigidly mounted, whereas the upper half 4 is constructed so as to be rotatable and is driven by the motor 6 via the shaft 5. Partly visible is the lower edge 7 of the drum half 4, in which lower edge 7 a recess 8 is present through which projects the magnetic head 9 which has a gap 10. The head 9 is rigidly mounted on the drum half 4 and is rotated with it in the direction of the arrow 11.

The magnetic tape 1 is unwound from a storage reel (not shown) and travels via a capstan (not shown) on one side to the drum 2 and on the other side away from it, as is denoted by the arrows 12 and 13, to a winding reel (not shown). Pressure rollers 14 and 15 ensure that the tape 1 is pressed against the drum 2. In the case in which only one head is present, the tape 1 lies around the drum 2 over an angle of well over 360°. When two heads placed diametrically opposite to each other are present, the tape 1 lies around the drum 2 over an angle of well over 180°.

It is to be noted that the transport of the tape 1 along the circumference of the drum 2 takes place at an angle $\alpha$ relative to the plane in which the head 9 rotates.

Figure 2:
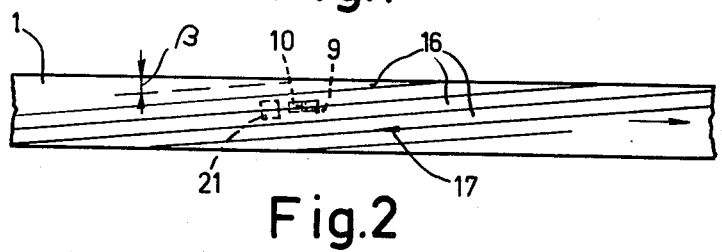
FIG. 2 shows a magnetic tape on which tracks of information are recorded by means of the recorder shown in FIG. 1.

With the above-mentioned directions of rotation the magnetic head 9 describes parallel tracks 16 on the tape 1 (FIG. 2). As shown in FIG. 2 said tracks 16 extend on the tape 1 from one edge to the other at an angle $\beta$ with the longitudinal direction of the tape 1. The arrow 17 denotes the direction in which the tracks extend.

In order to reduce the coercive force of the tape 1 locally so as to be able to record information, a radiation source 18 is provided which produces an energy beam 19 which, via the mirror 20 rigidly mounted on the drum half 4, is focused on a place of the tape 1 which lies immediately in front of the head 9, for example, at 0.5 mm in front of the recording gap 10 and thereby moves synchronously with the head 9. As a result of the high relative velocity of the head relative to the tape (for example 8 m/second) and due to the focusing of the heating energy on the track to a spot 21 of, for example, 100 × 300 $\mu$m, the heating time is only a few tenths of a millisecond. In connection with the possible cooling in time which the heated place on the tape needs to come under the influence of the recording field of the head, the dimension of the spot in the direction of the track width is preferably taken to be slightly larger than the track width. The dimension of the spot in the direction transverse to the track width should be chosen to be so that it is approximately equal to but preferably smaller than the distance between the place where the tape is heated and where it is recorded. For further explanation FIG. 2 also shows the place at a given instant of the magnetic head 9 and the heated spot 21.

Figure 3:
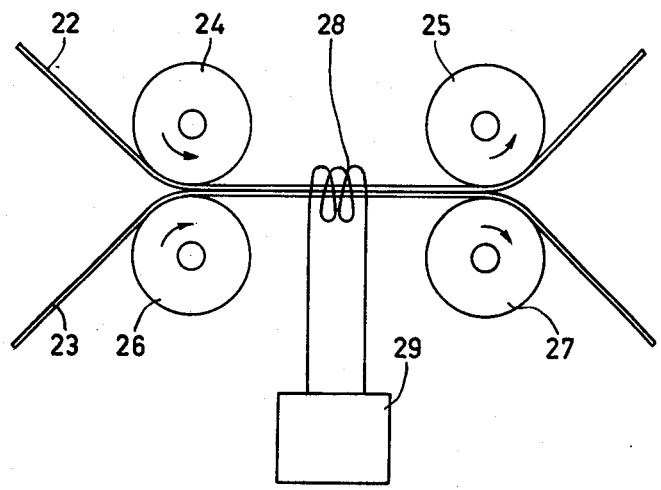
FIG. 3 shows diagrammatically an anhysteretic copying device.

As already explained above it is possible in this manner to provide very highly coercive tapes with information. Similar tapes can be used very effectively as master tapes in an anhysteretic copying process. How such a copying process proceeds is shown diagrammatically in FIG. 3. A highly coercive master tape 22 on which information is recorded is transported via a capstan (not shown) from a storage reel (not shown) to a winding reel (not shown). At the same time a slave tape 23 is transported from a storage reel (not shown) to a winding reel (not shown). On their way the two tapes are contacted with each other, the rollers 24, 25, 26 and 27 ensuring a good contact between the tapes 22 and 23 which have their magnetic layers facing each other. While the tapes are in contact with each other they are subjected to an auxiliary field which can be produced, for example, by means of the coil 28 energized by the voltage source 29.

Figure 4:
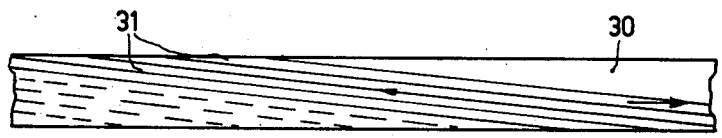
FIG. 4 shows a magnetic tape on which the information of the tape of FIG. 2 has been copied by means of the device shown in FIG. 3.

When the information is printed in this manner, the tracks 16 of the tape 1 in FIG. 2 will appear as a replica on the tape 30 in FIG. 4 in which the tracks are denoted by reference numeral 31. This would impede the correct playback of such a slave tape. In order to prevent this, the tracks on the master tape are already recorded as a replica so that the slave tapes does ultimately not contain the information in a mirror-inverted manner.

Figure 5:
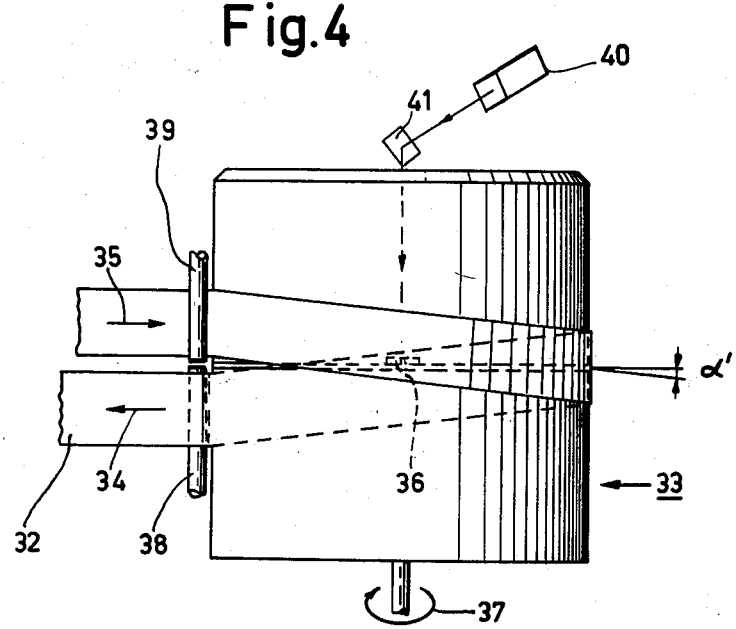
FIG. 5 shows diagrammatically an embodiment of the video recorder according to the invention with which it is possible to record tracks which are the replicas of the tracks recorded by means of the recorder shown in FIG. 1.

FIG. 5 shows diagrammatically a construction of the recorder according to the invention suitable for this purpose. It differs from the recorder shown in FIG. 1 in that the tape 32 is wound differently about the drum 33. The tape moves in the direction of the arrows 34, 35, while the head 36 rotates in the direction of the arrow 37. The rollers 38 and 39 produce the angular displacement. A radiation source 40 and a mirror system (of which only mirror 41 is shown) are present to produce an energy spot travelling in front of the head 36.

It is to be noted that, although the invention has been explained with reference to a video recorder of the "helical scan" type, the invention may of course also be used in a video recorder of the "transversal scan" type.

What is claimed is:

1. A device for recording information on a magnetizable record medium having a temperature-dependent coercive force and being provided on an elongated carrier, comprising means for moving the carrier, at least one magnetic transducer cooperating with the recording medium for producing a magnetic field having a field strength at the area of the recording medium below the coercive force at room temperature thereof, and a heating source to locally heat the recording medium to a temperature above room temperature, the improvement comprising a rotatable cylindrical supporting member around which the record carrier is laid and on the circumference of which the transducer is mounted, the rotatable cylindrical supporting member constituting a means for moving the transducer in a direction which encloses an angle with the direction of movement of the record carrier, wherein the heating source is a source of radiation arranged independently of the supporting member and producing a concentrated energy beam, means mounted on the supporting member for directing the energy beam onto the record carrier and for focussing the energy beam in a location in front of the transducer viewed in the direction of rotation of the supporting member, whereby the energy beam is moved synchronously with the electro-magnetic transducer.

2. A device as claimed in claim 1, wherein the source of radiation is a laser.

3. A device as claimed in claim 1, further comprising means for supplying to a detection device part of an energy beam reflected by the record carrier, with which detection device a signal can be generated which controls the energy output of the source of radiation.

4. A device for recording information on a magnetizable recording medium having a temperature-dependent coercive force and being provided on an elongated carrier, comprising a rotatable cylindrical supporting member around which the record carrier is laid in a loop and on the circumference of which the transducer is mounted, the rotatable cylindrical supporting member constituting a means for moving the transducer in a direction which encloses an angle with the direction of movement of the record carrier, wherein the heating source is a source of radiation rigidly mounted on the supporting member and producing a concentrated energy beam, means mounted on the supporting member for directing the energy beam onto the record carrier and for focussing the energy beam on a location in front of the transducer viewed in the direction of rotation of the supporting member, whereby the beam is moved synchronously with the electro-magnetic transducer.

5. A device as claimed in claim 4, wherein the source of radiation is a laser.

6. A device as claimed in claim 4, further comprising means for supplying to a detection device part of an energy beam reflected by the record carrier, with which detection device a signal can be generated which controls the energy output of the source of radiation.

* * * * *

UNITED STATES PATENT AND TRADEMARK OFFICE
CERTIFICATE OF CORRECTION

PATENT NO. : 3,969,765
DATED : July 13, 1976
INVENTOR(S) : JAN ROOS

It is certified that error appears in the above-identified patent and that said Letters Patent are hereby corrected as shown below:

ON THE TITLE PAGE

Please insert where appropriate:

--[30]   Foreign Application Priority Data

June 1, 1973   Netherlands..............7307626--;

Signed and Sealed this

Eleventh Day of January 1977

[SEAL]

Attest:

RUTH C. MASON
*Attesting Officer*

C. MARSHALL DANN
*Commissioner of Patents and Trademarks*